United States Patent
Bielas et al.

[11] Patent Number: 6,002,481
[45] Date of Patent: Dec. 14, 1999

[54] FIBER OPTIC GYRO WITH NOIZE DITHER CIRCUIT FOR ENHANCING A/D CONVERSION RESOLUTION

[75] Inventors: Michael S. Bielas, Tucson; Tamim F. El-Wailly, Phoenix, both of Ariz.

[73] Assignee: Honeywell, Inc., Minneapolis, Minn.

[21] Appl. No.: 09/057,210

[22] Filed: Apr. 8, 1998

[51] Int. Cl.⁶ ................................................. G01B 19/72
[52] U.S. Cl. ............................................................ 356/350
[58] Field of Search ............................ 356/350; 329/358

[56] References Cited

U.S. PATENT DOCUMENTS

| | | |
|---|---|---|
| 4,705,399 | 11/1987 | Graindorge et al. . |
| 4,833,417 | 5/1989 | Schroeder ................................. 329/50 |
| 4,948,252 | 8/1990 | Cekorich . |
| 5,009,480 | 4/1991 | Okada et al. . |
| 5,144,311 | 9/1992 | Buhler et al. . |
| 5,159,575 | 10/1992 | Winston, Jr. . |
| 5,182,611 | 1/1993 | Bielas et al. . |
| 5,185,642 | 2/1993 | Göckler . |
| 5,214,488 | 5/1993 | Büschelberger et al. . |
| 5,229,843 | 7/1993 | Dorsman . |
| 5,280,339 | 1/1994 | Hollinger et al. . |
| 5,331,404 | 7/1994 | Moeller et al. . |
| 5,363,195 | 11/1994 | Ward et al. . |
| 5,412,471 | 5/1995 | Tada et al. . |
| 5,469,257 | 11/1995 | Blake et al. . |
| 5,471,301 | 11/1995 | Kumagai et al. . |
| 5,485,273 | 1/1996 | Mark et al. . |
| 5,684,589 | 11/1997 | Mark et al. ............................. 356/350 |

FOREIGN PATENT DOCUMENTS

| | | |
|---|---|---|
| 4-76415 | 3/1992 | Japan . |
| 6-3154 | 1/1994 | Japan . |

*Primary Examiner*—Samuel A. Turner
*Attorney, Agent, or Firm*—Albert K. Kau

[57] ABSTRACT

A signal processing circuit for a fiber optic gyroscope which prevents glitches from saturating the photodetector and gain stages of the detection electronics by inserting random noise in the detected signal is disclosed. This technique allows one to control the noise density function, the noise level and the noise spectrum of the detected signal.

7 Claims, 2 Drawing Sheets

FIBER OPTIC GYRO WITH NOIZE DITHER CIRCUIT FOR ENHANCING A/D CONVERSION RESOLUTION

TECHNICAL FIELD

The present invention relates, generally, to fiber optic gyros and, more particularly, to an apparatus and method for adding noise to the analog output signal of the gyro to enhance the gyro's analog to digital conversion resolution.

BACKGROUND ART AND TECHNICAL PROBLEMS

Fiber optic gyroscopes (FOGs) are well known in the art. The output of the gyroscope are optical pulses which occur at a rate dependent upon the rate of rotation of the gyroscope. The optical pulses are converted to an analog electric signal by well known photo diode arrays. The FOG instrumentation and display units typically require the gyro signals to be in a digital format; therefore, it is necessary to convert the analog signal to a corresponding digital signal.

One problem with the digital conversion of the analog signal is that random noise in the signal can cause conversion errors. Typically, the older gyro designs produced lower optical power and, accordingly, lower analog signals. Therefore, the signal could be amplified substantially before entering the analog to digital converter. The combination of the photo diode conversion and amplification of the signal typically produced enough RMS noise so that the combination of the random noise and RMS noise could be averaged, offsetting any errors caused by the random noise. However, the development of higher optical power in the FOGs has meant that the front end gain had to be reduced sufficiently to prevent artifacts or "glitches" from saturating the photo detector and gain stages. With the reduction of the front end gain, not enough EMS noise is available to provide adequate noise averaging of the signal, thus, the random noise glitches are still present. Because the A/D converters typically have limited number of bits (typically 8 or 12), even small random noise glitches will cause quantization errors in the A/D conversion.

SUMMARY OF THE INVENTION

The present invention provides methods and apparatus for enhancing the analog to digital conversion of a fiber optic gyro signal which overcome many of the shortcomings of the prior art.

In accordance with a preferred embodiment of the present invention, a fiber optic gyro system comprises a fiber optic gyre configured to generate an analog signal, and a digital signal processor circuit configured to receive the analog signal and convert that signal to a digital signal. The digital signal processor circuit is configured to enhance the resolution of the analog to digital conversion of the gyro signal.

In accordance with one embodiment of the invention, the digital signal processor circuit comprises an analog noise generator for generating an input noise signal. The circuit further comprises a, conventional operational amplifier circuit configured to add the noise input signal with the fiber optic gyro analog signal. Finally, the signal digital processor circuit comprises an analog to digital converter which receives the output of the op amp and converts the analog signal to a digital signal.

In accordance with another embodiment of the present invention, the digital signal processor circuit comprises a digital signal generator which creates a digital input signal. A digital to analog converter receives the digital input signal from the signal generator and converts it to an analog input signal. Next, a sum and gain operational amplifier circuit receives the analog input signal and the analog gyro signal and adds the signals together creating a summed analog signal. An analog to digital converter then converts the summed analog signal to a digital gyro signal. Finally, a digital substraction circuit receives the converted digital gyro signal and the digital input signal from the digital signal generator, and subtracts the digital input signal from the digital gyro signal, creating an accurate digital output signal indicative of the analog gyro signal created by the fiber optic gyro.

In accordance with yet a further embodiment of the present invention, a method of enhancing the resolution of the analog to digital conversion of a fiber optic gyro signal is disclosed. The first step in the method is to provide a fiber optic gyro which generates an analog gyro signal. Next, a noise signal is generated and then added to the first analog gyro signal, creating a second analog gyro signal. The second analog gyro signal is then converted to a digital signal by an A/D converter.

In accordance with yet another embodiment of the present invention, a second method of enhancing the resolution of the analog to digital conversion of a fiber optic gyro is disclosed. In accordance with this embodiment, a digital signal generator first generates a digital input signal. Next, the digital signal is converted to an analog signal by an analog to digital converter. The analog input signal is then added to the fiber optic gyro analog signal creating a second analog signal. The second analog gyro signal is then converted to a digital signal by an analog to digital converter. Finally, the originally generated digital input signal is subtracted from the output of the analog to digital converter, creating a digital signal indicative of the original fiber optic gyro analog signal.

BRIEF DESCRIPTION OF THE DRAWING FIGURES

The present invention will hereinafter be described in conjunction with the appended drawing figures, wherein like numerals denote like elements, and:

DETAILED DESCRIPTION OF A PREFERRED EXEMPLARY EMBODIMENT

The subject invention relates to improved methods and apparatus for enhancing the analog to digital conversion resolution of a fiber optic gyro signal. By adding the additional noise to the gyro signal before converting it to a digital signal, the resolution of the A/D conversion can be enhanced by a factor of about 10–1 to about 20–1.

Figure 1:
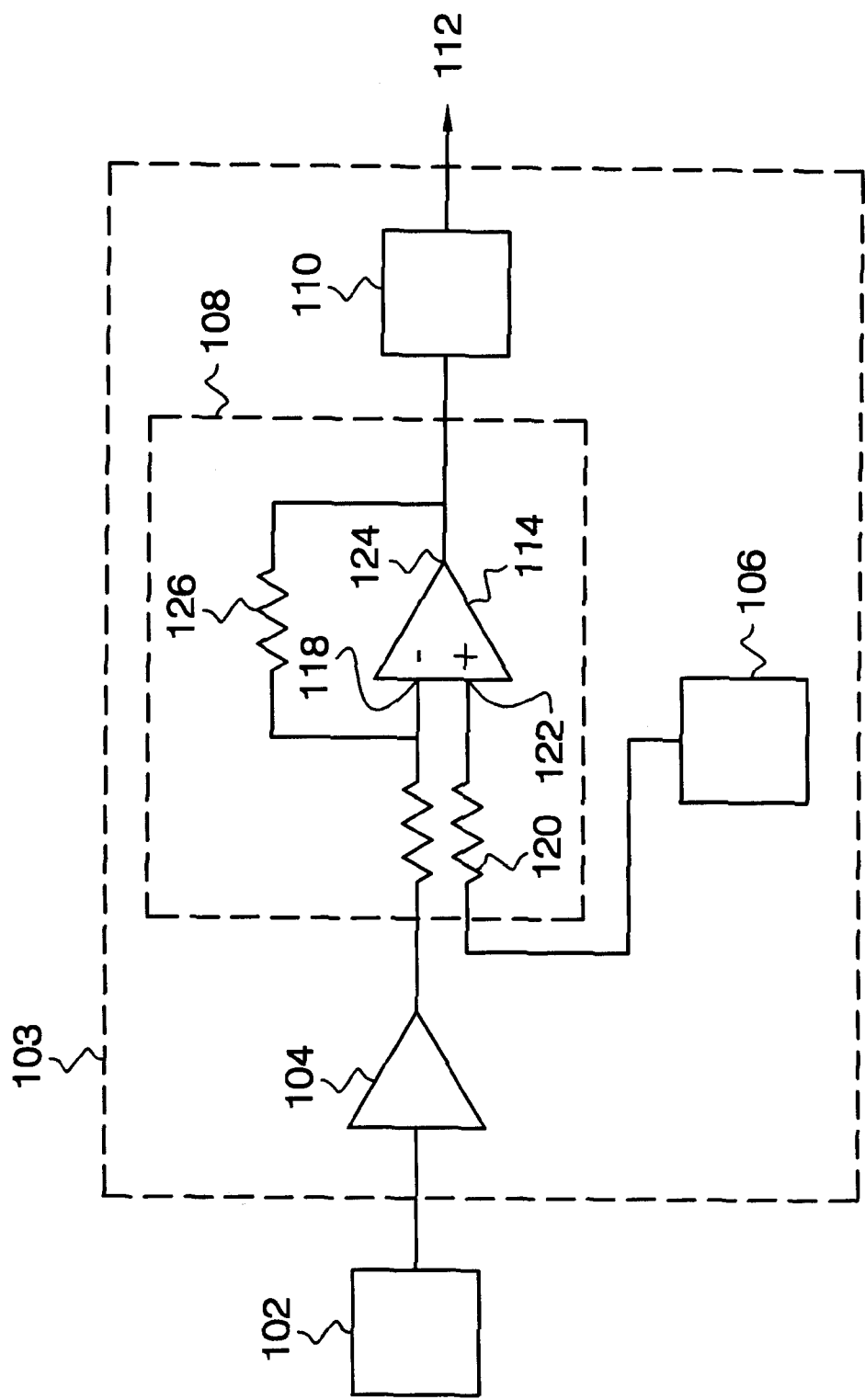
FIG. 1 is a diagram of one embodiment of a fiber optic gyro system having an improved digital signal processing circuit.

Referring now to FIG. 1, a fiber optic gyro ("FOG") system 100 is shown. In accordance with a preferred embodiment of the invention, FOG system 100 preferably comprises a fiber optic gyro 102, and a digital signal processing circuit 103.

Fiber optic gyro 102 is a typical fiber optic gyro assembly which is well known in the art. The FOG assembly generates an analog output signal which is indicative of the rotation of the gyroscope. The analog output signal of the gyro is received by digital signal processing circuit ("DSP") 103 which converts the signal to a digital output for use by gyro signal processing and display units.

As illustrated in FIG. 1, DSP 103 comprises an amplifier 104, a noise generator 106, a sum and gain circuit 108 and an analog to digital converter 110. In accordance with the preferred embodiment of the invention, the analog gyro signal is first amplified by amplifier 104. Sum and gain circuit 108 is configured to receive the signal from amplifier 104, as well as an analog noise signal generated by noise generator 106. Noise generator 106 may be a random, pseudo random or deterministic signal generator which are all well known in the art. Additionally, a typically operational amplifier may be used to generate the necessary noise signal.

In accordance with a further embodiment of the invention, generator 106 may be a digital signal generator which generates random digital signals or a deterministic signal such as a triangle or square wave signal. In accordance with this embodiment, the generated digital signal must first be converted to an analog signal by, for example, a digital to analog converter before it enters sum and gain circuit 108.

Sum and gain circuit 108 is configured to add the amplified analog gyro signal and the analog noise signal together, creating an analog signal having a sufficiently high RMS value of noise or dither so that the noise in the signal can be averaged out in the analog to digital converter.

In accordance with one embodiment in the present invention, sum and gain circuit 108 suitably comprises a well known operational amplifier circuit configuration as illustrated in FIG. 1. The op amp circuit comprises a typical op amp 114 having input terminals 118, 122 and an output terminal 124. Circuit 108 further includes a resister 116 coupled to input terminal 118, a resister 120 coupled to input terminal 122 and a resistor 126 connected in a feedback loop between output terminal 124 and input terminal 118. Op amp 114 receives the signal from amplifier 104 through resister 116 and input terminal 118, while the noise signal is received through input terminal 122 and resister 120. It should be noted, that the sum and gain circuit disclosed herein is well known in the art, and that any other suitable circuit configuration for adding two signals may be utilized.

The output signal from sum and gain circuit 108 is received by analog to digital converter 110 which averages out the noise and converts the signal to a digital output signal 112. A/D converter 110 may be any suitable A/D converter having sufficient resolution (i.e., 8 or 12 bit resolution).

Figure 2:
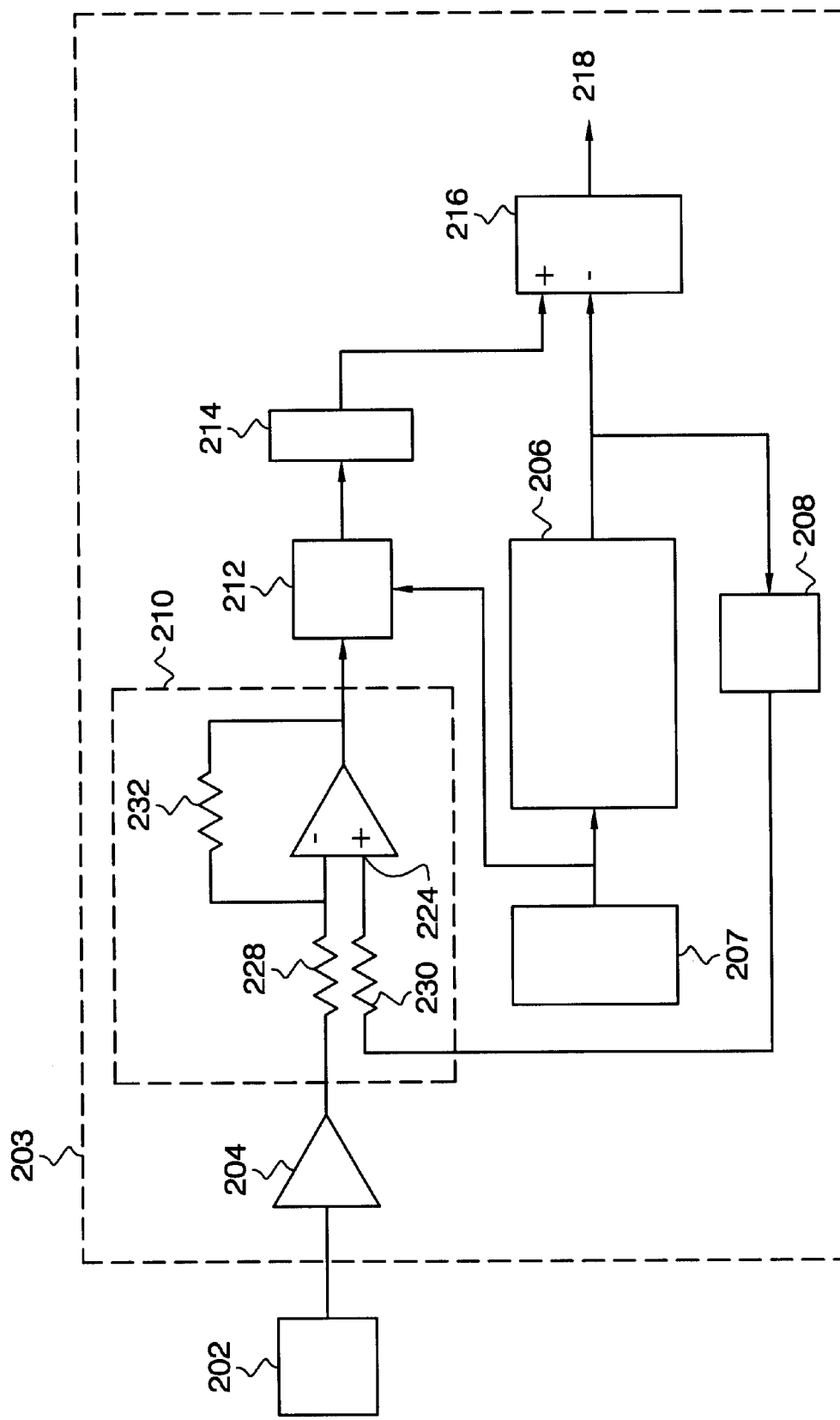
FIG. 2 is a diagram of a second embodiment of a fiber optic gyro system having a different digital signal processing circuit.

Referring now to FIG. 2, a second embodiment of an improved fiber optic gyro system 200 is illustrated. In accordance with this embodiment of the invention, FOG system 200 comprises a fiber optic gyro 202 and a digital signal processor circuit 203. As with the first embodiment, FOG 202 may comprise any suitable FOG assembly.

Digital signal processor 203 suitably comprises an amplifier 204, a digital signal generator 206, a digital to analog converter 208, a sum and gain circuit 210, an analog to digital converter 212, and a digital subtraction circuit 216. In accordance with a preferred embodiment of the invention, the analog signal generated by the FOG is first amplified by amplifier 204. Sum and gain circuit 210 is configured to receive the amplified analog gyro signal from amplifier 204, as well as an analog signal output from D/A converter 208. Signal generator 206 is configured to create a digital input signal which is first converted to an analog signal by D/A converter 208 and then added to the gyro signal as noise.

Generator 206 may be a random number generator, or it may generate a deterministic wave signal, such as, for example, a triangle wave, a square wave, or the like. The digital signal from generator 206 may comprise any number of bits of resolution, however, in accordance with a preferred embodiment, generator 206 will typically generate an eight bit signal. In addition, generator 206 is suitably connected to a clock pulse signal 207 which sets the sampling rate for the generator signal.

As mentioned previously, the digital signal from generator 206 is first converted to an analog signal by D/A converter 208 and is then added to the FOG analog signal by sum and gain circuit 210. In accordance with one embodiment in the present invention, sum and gain circuit 210 suitably comprises a well known operational amplifier circuit configuration as illustrated in FIG. 2. The op amp circuit comprises a typical op amp 220 having input terminals 222, 224 and an output terminal 226. Circuit 210 further includes a resister 228 coupled to input terminal 222, a resister 230 coupled to input terminal 224 and a resistor 232 connected in a feedback loop between output terminal 226 and input terminal 222. Op amp 220 receives the signal from amplifier 204 through resister 228 and input terminal 222, while the noise signal is received through input terminal 224 and resister 230. As mentioned previously, it should be noted, that the sum and gain circuit disclosed herein is well known in the art, and that any other suitable circuit configuration for adding two signals may be utilized.

The output signal from sum and gain circuit 210 is received by analog to digital converter 212 which averages out the noise and converts the signal to a digital output signal. As discussed previously, A/D converter 212 may be any suitable A/D converter having sufficient resolution (i.e., 8 or 12 bit resolution). However, if the resolution of A/D converter 212 is less than the resolution of the digital signal created by generator 206, the output signal from the A/D converter must be modified so that both signals have the same resolution. For example, if digital number generator 206 creates a signal having 12 bit resolution, and the A/D converter's resolution is only 8 bits, 4 additional bits must be added to the A/D converter output signal. Thus, a level shift and two's complementary circuit 214 is provided which adds an additional 4 bits to the 8 bit signal. If, however, the A/D converter signal and the generated signal have the same bit resolution, circuit 214 is not needed.

After the digitally converted gyro signal is modified (if needed) to the proper bit resolution, digital subtraction circuit 216 receives the digital gyro signal and subtracts out the signal created by the digital signal generator, creating an output signal 218 which is a digital representation of the analog gyro signal. By subtracting out the noise that was previously added to the gyro signal, any alteration in the gyro signal caused by the addition of the noise is rectified.

Also, the second embodiment disclosed above utilizes a digital signal generator. However, an alternative embodiment of the invention may include an analog signal generator which generates either random noise or a deterministic wave signal. In accordance with this embodiment of the invention, the initial noise signal can be added to the analog gyro signal in sum and gain circuit 210 without first having to be converted from a digital to an analog signal. However, the noise generated by the analog generator, must then be converted to a digital signal by a digital to analog converter before it is subtracted from the digital gyro signal output by subtraction circuit 216.

In summary, the present invention as disclosed herein provides an improved fiber optic gyro system which includes an improved circuit for enhancing the resolution of the analog to digital conversion of the gyro signal.

The present invention has been described with reference to preferred embodiments. However, those skilled in the art will recognize that changes and modifications may be made to the preferred embodiments without departing from the scope of the present invention. For example, the sum and gain circuits described herein may comprise any suitable sum and gain circuitry, not just the embodiment disclosed. Furthermore, the specific circuit configuration disclosed herein may be modified according to the requirements of each individual application. These and other changes and modifications are intended to be included within the scope of the present invention, as expressed in the following claims.

What is claimed is:

1. A fiber optic gyro system, comprising:
   (a) a fiber optic gyro configured to generate a first analog gyro signal having a first noise component; and
   (b) a digital signal processor circuit configured to receive said first analog gyro signal, said digital signal processor circuit comprising:
      (i) a noise generator configured to generate a noise signal;
      (ii) means for adding said noise signal to said first analog gyro signal to thereby create a second analog gyro signal; and
      (iii) means for converting said second analog gyro signal to a digital output signal so as to substantially minimize the effects of said first noise component.

2. The fiber optic gyro system as recited in claim 1, wherein said noise generator is an analog noise generator.

3. The fiber optic gyro system as recited in claim 1, wherein said noise generator is an operational amplifier.

4. The fiber optic gyro system as recited in claim 1, wherein said noise generator is a digital noise generator, and said digital signal processor circuit further comprises a means for converting the digital noise signal from said digital noise generator to an analog noise signal before adding the noise signal to the analog gyro signal.

5. A method of enhancing a resolution of an analog to digital conversion of a fiber optic gyro output signal, said method comprising the steps of:

(a) providing a fiber optic gyro which generates a first analog gyro signal having a first noise component;
   (b) generating a noise signal;
   (c) adding said noise signal to said first analog gyro signal, to generate a second analog gyro signal having a second noise component such that said second noise component is averaged and the effects of said first noise component are substantially reduced; and
   (d) converting said second analog gyro signal to a digital output signal.

6. A method of operating a fiber optic gyro, said method comprising the steps of:
   (a) providing a fiber optic gyro which generates a first analog gyro signal having a first noise component;
   (b) generating a digital noise signal;
   (c) converting said digital noise signal into an analog noise signal;
   (d) adding said analog noise signal to said first analog gyro signal, to generate a second analog gyro signal having a second noise component such that said second noise component is averaged and the effects of said first noise component are substantially reduced;
   (e) converting said second analog gyro signal to a digital gyro signal.

7. A gyroscope system, comprising:
   (a) a gyroscope configured to generate a first gyro signal having a first noise component; and
   (b) a signal processor circuit configured to receive said first gyro signal, said signal processor circuit comprising:
      (i) a noise generator configured to generate a noise signal;
      (ii) an adder configured to add said noise signal to said first gyro signal to generate a second gyro signal having a second noise component; and
      (iii) a converter configured to convert said second gyro signal to a gyroscope output signal so as to substantially minimize the effects of said first noise component.

* * * * *